United States Patent [19]

Buske

[11] Patent Number: 4,677,950
[45] Date of Patent: Jul. 7, 1987

[54] ROTARY CAM FLUID WORKING APPARATUS

[76] Inventor: Norm Buske, HCR 11 - Box 17, Davenport, Wash. 99122

[21] Appl. No.: 818,595

[22] Filed: Jan. 10, 1986

[51] Int. Cl.[4] .......................... F02B 53/00; F04C 2/00
[52] U.S. Cl. ...................................... 123/241; 418/165
[58] Field of Search .................. 123/241, 246; 418/58, 418/160, 161, 164, 165

[56] References Cited

U.S. PATENT DOCUMENTS

| | | |
|---|---|---|
| 626,206 | 5/1899 | Jasper . |
| 1,874,239 | 8/1932 | Cannizzaro . |
| 1,887,884 | 11/1932 | Eyston . |
| 2,097,881 | 11/1937 | Hopkins . |
| 2,181,962 | 12/1939 | Booth .............................. 418/165 X |
| 2,845,909 | 8/1958 | Pitkanen . |
| 2,919,062 | 12/1959 | Tryhorn .......................... 418/161 X |
| 2,938,663 | 5/1960 | Luck . |
| 2,988,065 | 6/1961 | Wankel et al. . |
| 3,102,683 | 9/1963 | Paschke et al. . |
| 3,387,771 | 6/1968 | Luck . |
| 3,439,654 | 4/1969 | Campbell, Jr. . |
| 3,789,809 | 2/1974 | Schubert . |
| 3,850,150 | 11/1974 | Plevyak . |
| 3,890,941 | 6/1975 | Paul, Jr. . |
| 3,987,767 | 10/1976 | Buske . |
| 4,373,484 | 2/1983 | Boehling . |

FOREIGN PATENT DOCUMENTS

| | | |
|---|---|---|
| 344108 | 11/1921 | Fed. Rep. of Germany . |
| 1000029 | 1/1957 | Fed. Rep. of Germany . |
| 1503498 | 6/1969 | Fed. Rep. of Germany . |
| 2412888 | 10/1975 | Fed. Rep. of Germany . |
| 3042783 | 5/1982 | Fed. Rep. of Germany . |
| 624371 | 9/1961 | Italy . |
| WO84/00993 | 3/1984 | PCT Int'l Appl. . |
| 791689 | 3/1958 | United Kingdom . |

*Primary Examiner*—Michael Koczo
*Attorney, Agent, or Firm*—Wells, St. John & Roberts

[57] ABSTRACT

Mechanical apparatus for compressing, expanding or otherwise working a fluid. The apparatus includes a rotor rotatably mounted in a housing. The rotor has an interior and rotor ports through which a working fluid flows into the rotor interior. Two or more cam structures are rotatably mounted within the rotor interior. A working volume is defined between interior surfaces of the rotor and adjacent cams. The cams are maintained in a desired orientation by a synchronizer. Apparatus according to the invention are useful as engines, compressors and in other fluid working applications.

25 Claims, 19 Drawing Figures

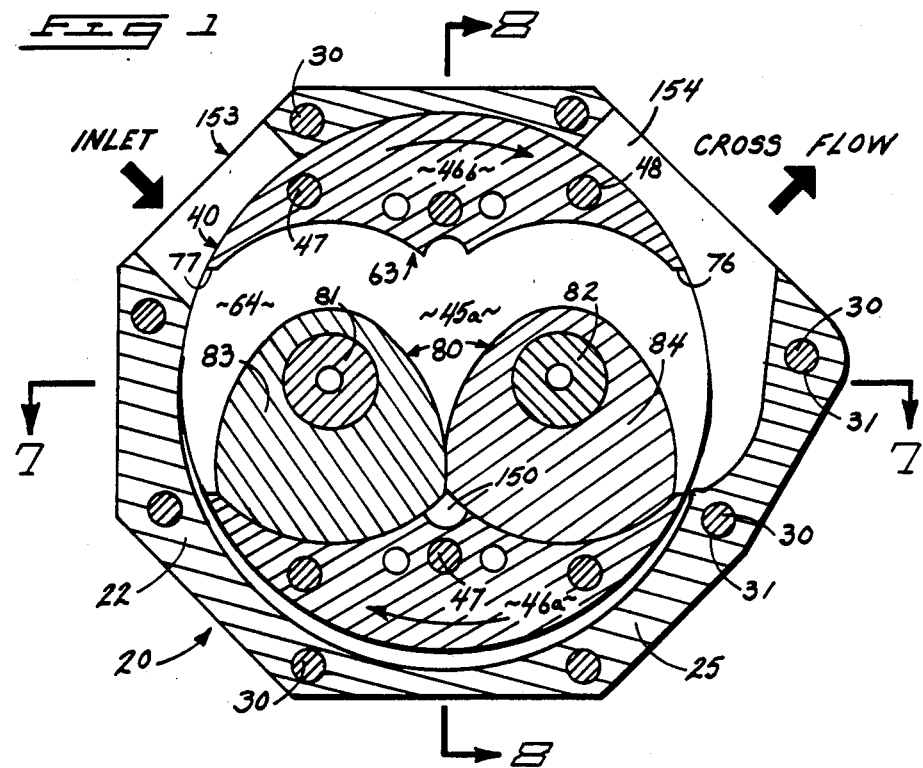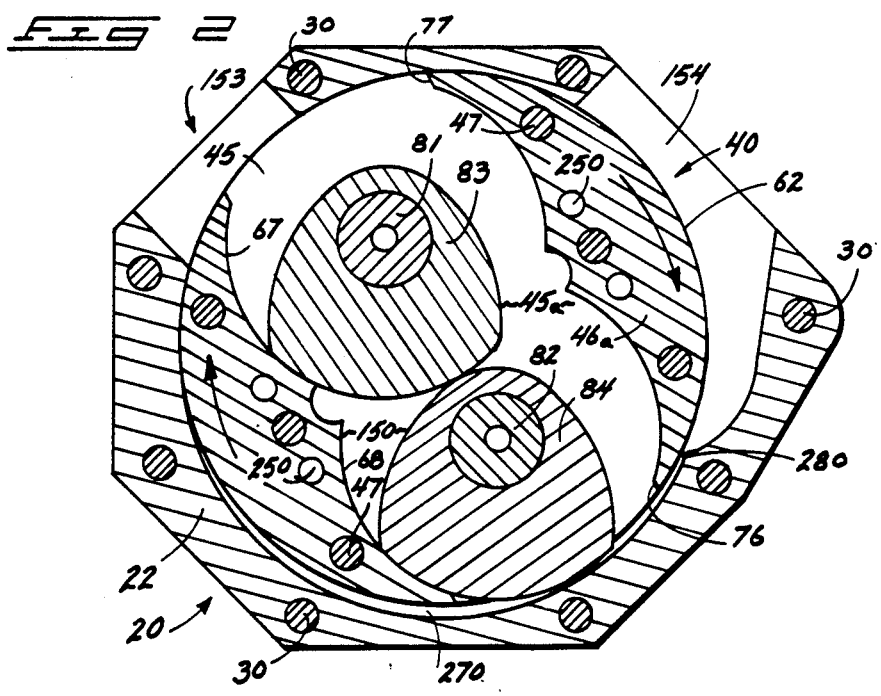

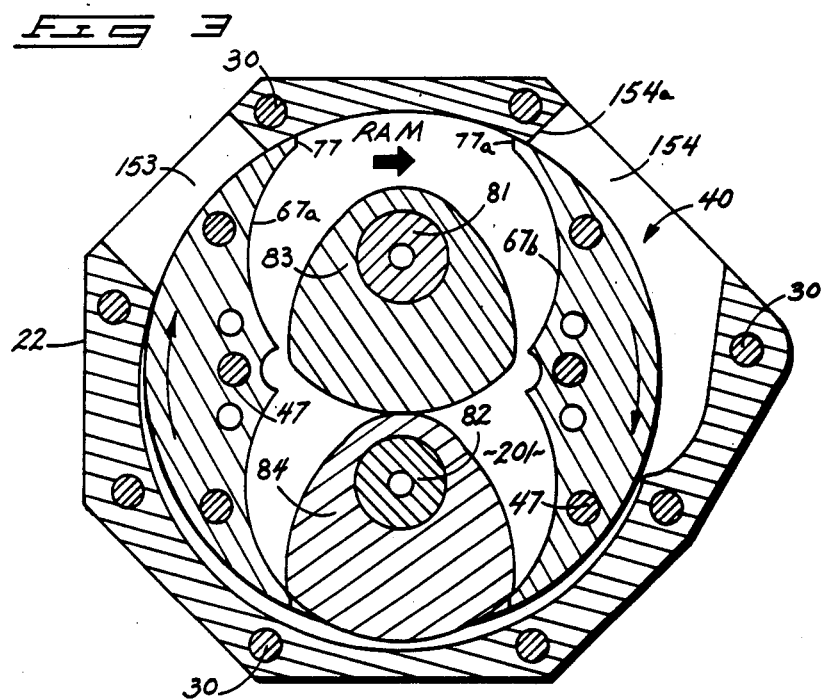
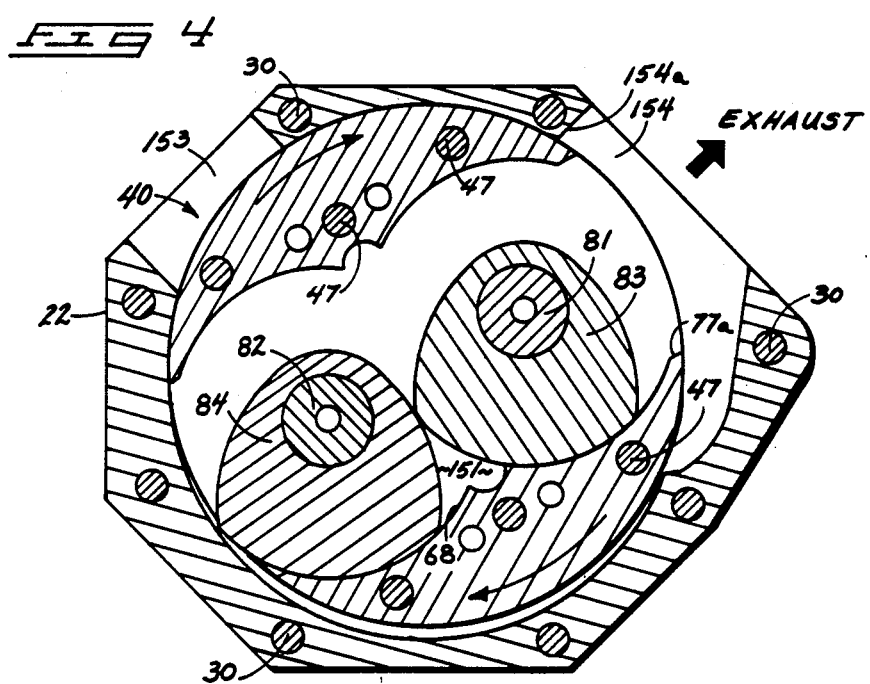

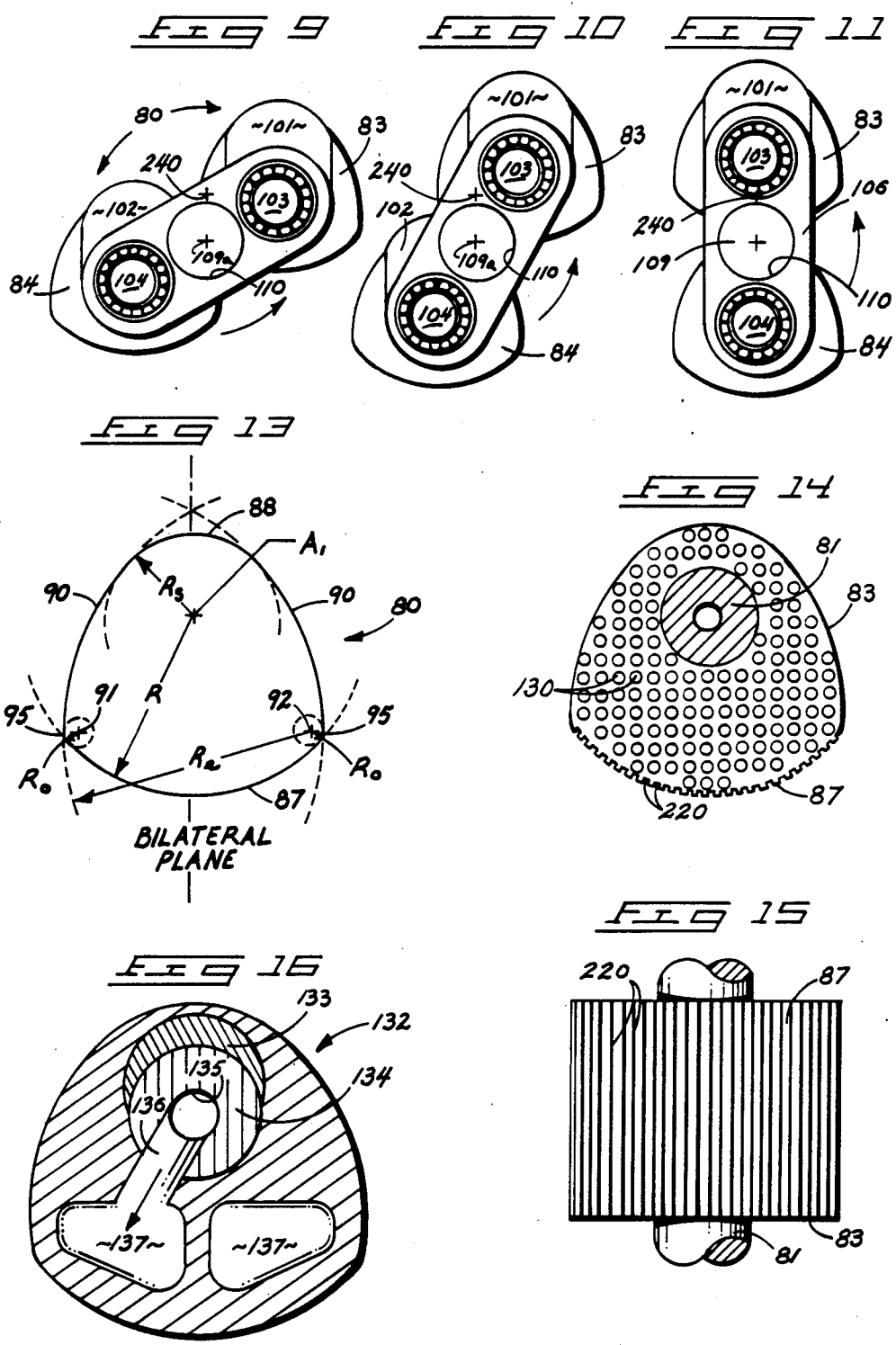

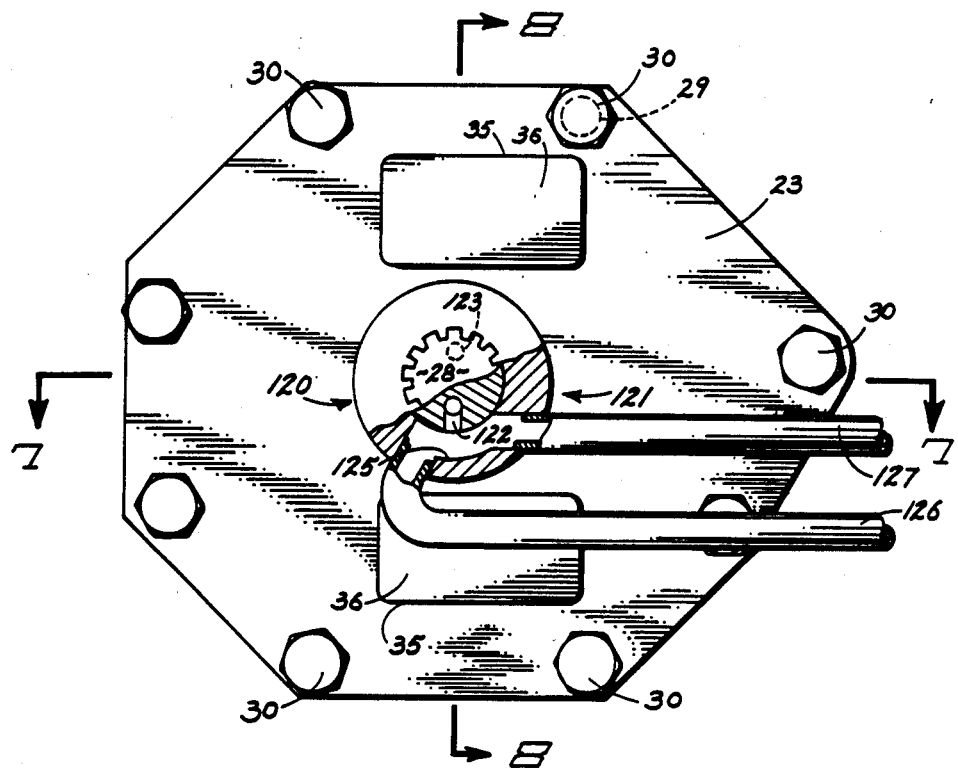
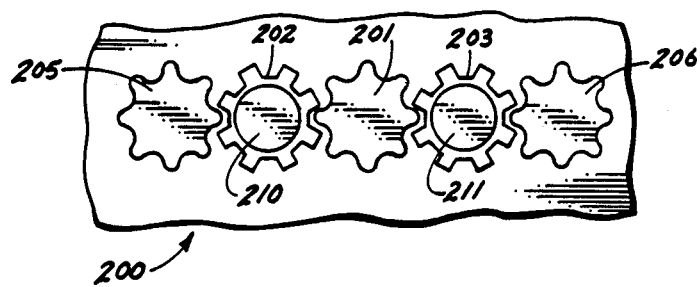

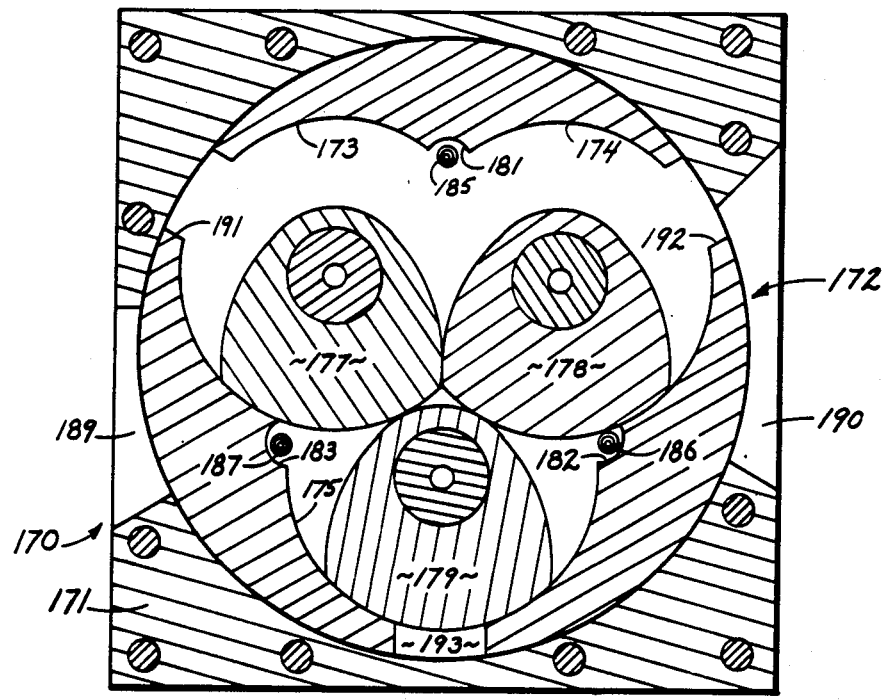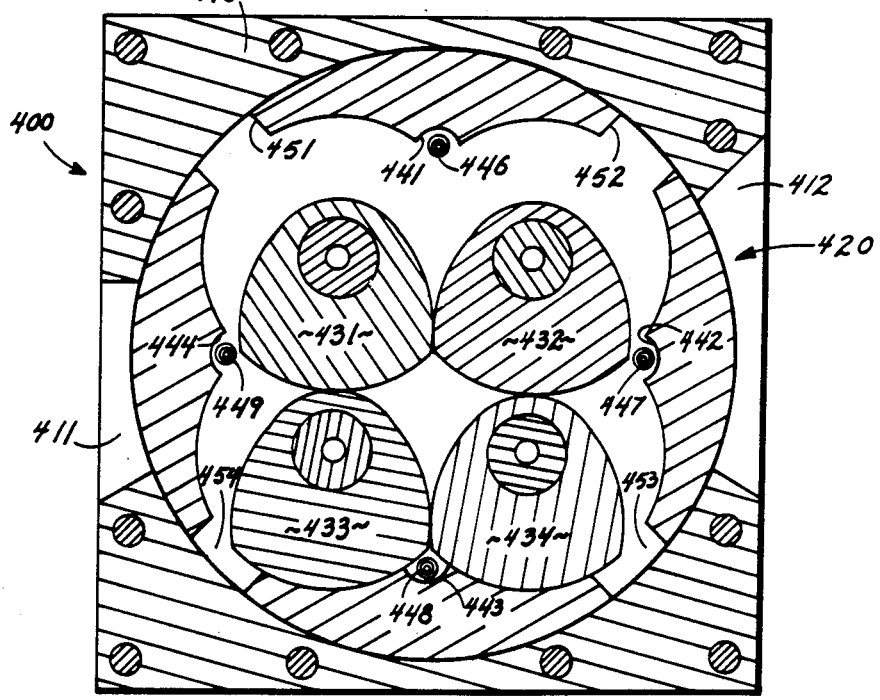

ROTARY CAM FLUID WORKING APPARATUS

TECHNICAL FIELD

The technical field of this invention is expandable and contractible chamber fluid working apparatus.

BACKGROUND OF THE INVENTION

Fluid working apparatus can broadly be broken into two basic types, namely, positive displacement and non-positive displacement. Positive displacement apparatus include reciprocating piston systems such as reciprocating piston engines, compressors, pumps, and the like. Positive displacement apparatus also include various rotating lobe engines and compressors. Non-positive displacement apparatus include turbine engines, centrifugal compressors, centrifugal pumps, and other equipment.

Positive displacement engines mechanically define the volume of the working fluid. This allows relatively high levels of torque to be developed over a broad range of operational speeds. Non-positive displacement engines such as turbine engines do not perform efficiently away from the design operational parameters. The loss of efficiency and power away from the design parameters renders them less effective where varying power, torque and speed requirements exist, such as for vehicular engines.

Reciprocating piston engines are currently in widespread use. Despite their reliable performance and broad torque capabilities, they suffer from a number of disadvantages. A principal problem of reciprocating piston engines is the relatively low speeds at which they must be operated. Low speed operation is necessitated by the relatively high accelerations experienced by the pistons and connecting rods as they start and stop twice during each rotation of the crankshaft.

Reciprocating engines also suffer from relatively high frictional losses. Principal sources of high friction are the piston rings or seals. Such ring seals are necessitated because of the relatively higher operating temperatures of the pistons in comparison to the cylinder walls which are usually cooled, such as by circulated water. Clearance must be provided between the pistons and cylinder walls so that the relatively greater thermal expansion of the pistons can be accommodated. Such clearances are sufficiently large that unsealed bypass leakage cannot be tolerated, thus requiring the sealing rings or some equivalent. Piston rings drag along the cylinder walls causing significant friction losses and necessitating almost constant lubrication of the seals and cylinder walls. Engine oils used in piston engines are thus exposed to the hot combustion gases which deteriorate the lubricating ability of the oil. This leads to increased maintenance in addition to the high frictional losses associated with the sealing rings.

Reciprocating piston engines are also plagued by geometrical and structural limitations which severely restrict the ability of the working fluid, such as air, to flow into and out of the combustion chamber. Typical reciprocating engine configurations use poppet type valves which have relatively small flow areas and convoluted flow paths. The associated valve lifting systems are relatively complex and utilize a large number of relatively costly components which also cause significant frictional losses. Such valve systems are also susceptible to deterioration as the combustion gases flow across the sealing surfaces of the valve.

Reciprocating piston engines are further characterized by exposure of the entire piston head to the hot combustion gases. This causes the piston head to be heated to such an extent that substantial cooling is required. This cooling increases engine cost and reduces engine efficiency.

Prior art inventions have addressed some of the limitations and disadvantages discussed above using rotary concepts. One of the most widely known alternatives is the Wankel rotary engine. Unfortunately, the Wankel engine suffers from a number of limitations, some of which are particular to that configuration. One of the most serious problems of the Wankel engine is the relatively short life of the apex seals located at the corners of the three-sided rotor.

The Wankel engine configuration is also disadvantageous because the high pressures of ignition and combustion are distributed over one full face of the three-sided rotor. This places substantial lateral forces on the rotor shaft which causes significant shaft deflection and further requires sealing the combustion chamber against leakage at the apexes of the rotor. High speed operation of Wankel engines further causes the rotor tips to move closer to the epitrochoidal chamber wall in which they operate. This further necessitates use of apex seals since clearance must be increased to allow operation up to the desired maximum engine speed.

The present invention provides a novel expandable and contractible fluid working apparatus well suited for use as an internal combustion engine. Other uses are also possible, such as for compressors, pumps, and in other fluid working applications.

SUMMARY DESCRIPTION OF ONE PREFERRED EMBODIMENT

A single preferred embodiment of this invention will now be summarily described to aid in easy understanding of the invention. This summary is not intended to limit the proper scope of this invention.

A preferred internal combustion engine according to this invention includes a housing having substantially cylindrical interior. Intake and exhaust openings exist in the housing. A rotor assembly is rotatably mounted in the housing interior. The rotor has a cylindrical exterior shape and has interior surfaces which are primarily defined by two overlapping internal cylindrical voids. The rotor is further provided with two ports through which air and exhaust flow.

Inside the rotor there are two specially shaped cam elements mounted on shafts. The cam elements rotate relative to the rotor, but are maintained in a desired angular orientation which is preferably constant relative to the housing. Rotation of the rotor causes the two cam elements to revolve about each other in a leap-frogging motion. Rotation of the rotor and the movement of the cam elements define two different combustion chambers in which air is compressed. Close clearances between the rotor and cam elements limit leakage from the combustion chambers to acceptable levels, preferably without sealing apparatus.

Fuel is injected into the two different combustion chambers at two different times, offset by approximately 180°. The fuel-air mixture is ignited such as by autoignition. Combustion of the compressed fuel-air mixture causes the rotor and cam assembly to rotate because of the expansion of the combusting mixture contained within the defined working volume. Such powered rotation of the rotor is utilized via an attached output shaft. The engine compresses, ignites, and expands two times per rotation, thus providing smooth rotary power capable of high speed operation. This engine configuration further provides high power output for the engine size and good torque capabilities over a broad range of operational speeds.

BRIEF DESCRIPTION OF THE DRAWINGS

Preferred forms of the invention are illustrated in the accompanying drawings, in which:

FIGS. 1-4 are cross-sectional views of an engine according to this invention, with a rotor assembly thereof shown in four different angular positions;

FIGS. 9-11 are schematic views showing three different angular positions of a preferred synchronizing apparatus used with the engine of FIG. 1;

FIG. 12 is a front elevational view of the engine of FIG. 1;

FIG. 13 is a schematic view illustrating geometric relationships of a preferred type of cam structure profile;

FIG. 14 is an end view of a cam element of FIG. 1 shown in isolation, mounted on a supporting cam shaft;

FIG. 15 is a bottom view of the cam element shown in FIG. 14;

FIG. 16 is a schematic cross-sectional view of an alternative cam structure;

FIG. 17 is a cross-sectional view of an alternative three cam engine according to this invention;

FIG. 18 is a cross-sectional view of an alternative four cam engine according to this invention; and FIG. 19 is a schematic end view of an alternative means for synchronizing the cam structures for the cam engine of FIG. 1.

DETAILED DESCRIPTION OF THE PREFERRED EMBODIMENTS

In compliance with the constitutional purpose of the Patent Laws "to promote the progress of science and useful arts" (Article 1, Section 8), applicant submits the following disclosure of the invention.

Figure 7:
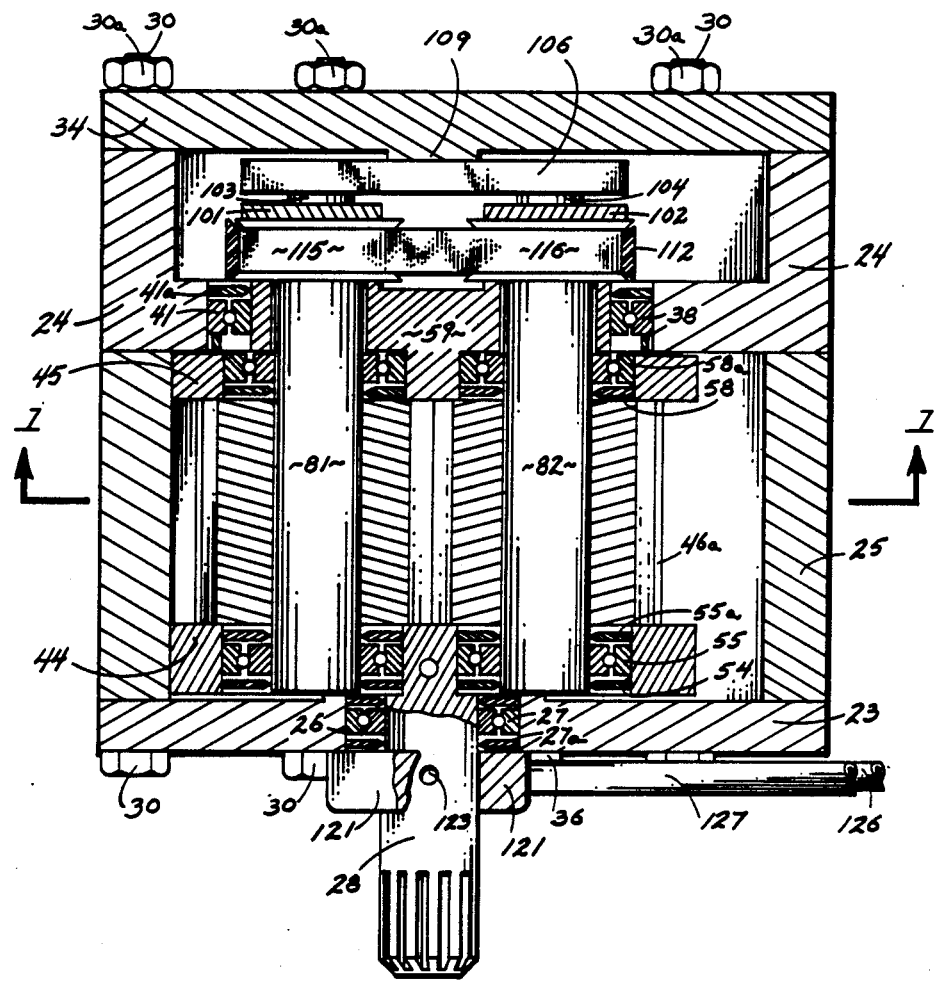
FIG. 7 is a longitudinal sectional view taken along line 7—7 of FIG. 1 or 12.
Figure 8:
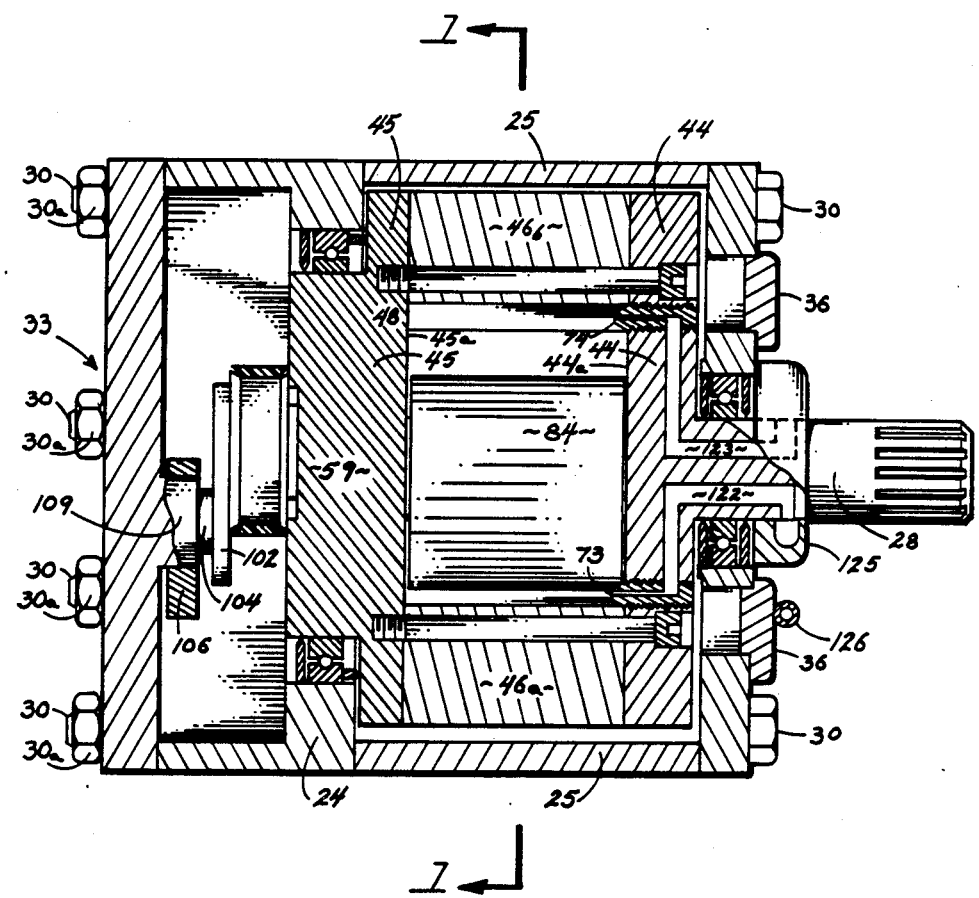
FIG. 8 is a longitudinal sectional view taken along line 8—8 of FIG. 1 or 12.

FIG. 1 shows a cross-sectional view of a preferred embodiment internal combustion engine 20 according to this invention. Can engine 20 includes a housing 22. Housing 22 is substantially enclosed and can be constructed in a variety of configurations, such as the generally hollow cylindrical configuration shown. FIGS. 7 and 8 show that housing 22 is preferably constructed using a front end piece 23 and a rear end piece 24. Housing 22 also includes an intermediate section 25 which is securely held between front end piece 23 and rear end piece 24. A crank case cover 34 is also preferably provided.

Housing 22 also includes an inlet passageway 153 and an exhaust passageway 154 which are advantageously formed through intermediate section 25.

Front end piece 23 is preferably provided with a shaft aperture 26 (FIG. 7) adapted for rotatably mounting an output shaft or drive shaft 28 therethrough. Front end piece 23 also includes a plurality of bolt apertures 29 (FIG. 12) which allow housing assembly bolts 30 to extend therethrough. Nuts 30a are threadably received on bolts 30. Housing assembly bolts 30 preferably extend through corresponding bolt apertures 31, 32 and 33 formed through intermediate piece 25, rear end piece 24, and crank case cover 34, respectively. Front end piece 23 also advantageously includes injector access openings 35 (FIG. 12) which are advantageously fitted with injector access caps 36, to provide maintenance access to fuel injectors 73, 74 described below.

Engine 20 further includes a rotor assembly 40 which is rotatably mounted to housing 22. Rotor 40 is preferably mounted within housing 22 using front drive shaft bearing 27 (FIG. 7) mounted within aperture 26 of front plate 23, and a rear rotor bearing 41, which is mounted within a rear bearing aperture 38 formed in rear end piece 24. Suitable seals 27a and 41a are advantageously provided for such bearings.

Rotor 40 is preferably constructed using rotor front piece 44, rotor rear piece 45 and intermediate rotor pieces 46a and 46b (FIGS. 1, 7, and 8). Rotor front, rear and intermediate pieces 44, 45 and 46 are advantageously held together into rotor assembly 40 using a plurality of rotor assembly bolts 47 (FIG. 1) extending through bolt holes 48 formed through rotor pieces 44-46.

Figure 6:
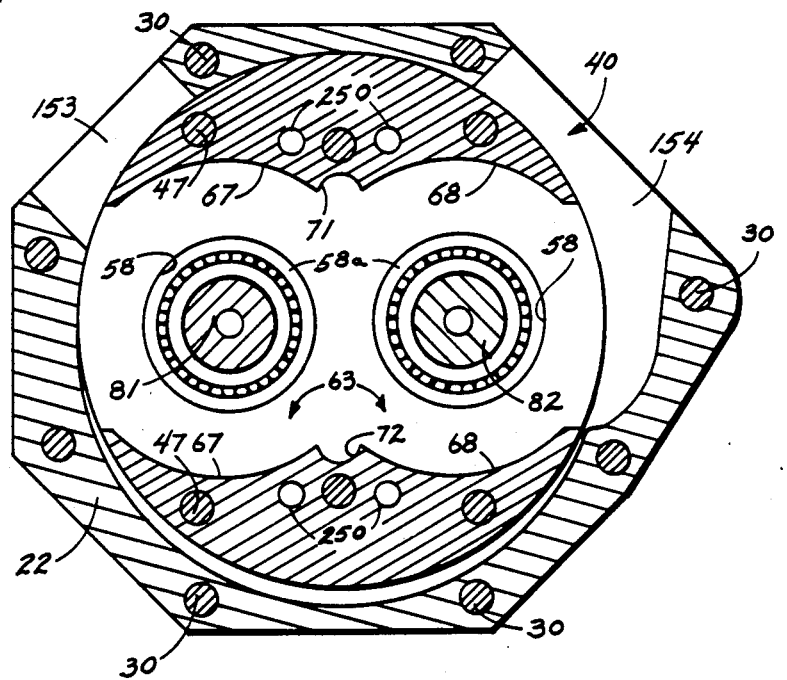
FIG. 6 is a cross-sectional view similar to FIG. 1 with cam elements removed.

Rotor front piece 44 can be constructed in a variety of configurations. Rotor front piece 44 is advantageously planar and circular, and can be either integral with or detachably connected to drive shaft 28. Rotor front piece 44 is also provided with suitable means for rotatably mounting a plurality of cam structures or assemblies 80 therein. FIGS. 6 and 7 show that such is advantageously accomplished using cam bearing apertures 54 formed through rotor front piece 44. Cam bearing apertures 54 are advantageously fitted with cam bearings 55 which can advantageously be ball or roller bearings having relatively small radial clearance. Cam bearings 55 are sized to receive cam shafts 81 and 82, and can be provided with suitable bearing seals 55a.

Rotor rear piece 45 can be constructed in a variety of configurations. Rotor rear piece 45 is advantageously planar, circular, and adapted for connection to other parts of rotor assembly 40. FIGS. 6 and 7 illustrate that rotor rear piece 45 can advantageously include a plurality of cam bearing apertures 58 with bearings 58a, mounting cam shafts 81 and 82 therein. Rotor rear piece 45 also advantageously includes a mounting extension 59 which extends rearwardly and is received by rear rotor bearing 41.

FIGS. 1 through 4 illustrate that the exterior surfaces 62 of rotor 40 preferably are circular in cross-section. Rotor 40 can advantageously be generally cylindrical. Rotor front and rear pieces 44 and 45 advantageously are provided with substantially planar interior rotor surfaces 44a and 45a (FIG. 8) which are advantageously parallel to one another and perpendicular to the longitudinal and rotational axis of rotor assembly 40. Rotor intermediate pieces 46 are provided with additional specially shaped interior surfaces which are herein termed lateral interior rotor surfaces 63 as distinct from rotor interior end surfaces 44a and 45a. The lateral interior rotor surfaces 63 shown in the two-cam embodiment of FIGS. 1 through 4 are conceptually defined by two overlapping cylinders. One such cylinder is coaxial with the longitudinal axis of first cam shaft 81 and is used to define cylindrical interior surfaces 67 (see FIG. 6). A second cylinder is coaxial with second cam shaft 82 and defines second cylindrical interior surfaces 68. The radii defining first and second cylindrical interior surfaces 67 and 68 are preferably equal to a primary or major radius R of cam structures 80 (see FIG. 13) plus an additional clearance c existing between the major surfaces of the cam structures and the cylindrical interior surfaces of rotor 40.

Rotor lateral interior surfaces 63 further advantageously include first and second cutouts 71 and 72 (FIG. 6). Cutouts 71 and 72 can be varied in volume to provide the compression ratio needed for the particular engine, compressor, or other rotating machinery constructed according to this invention. Cutouts 71 and 72 also provide appropriate passageways which allow fuel injected through fuel injectors 73 and 74 to pass longitudinally along the interior surfaces of the rotor so that relatively even dispersion of the fuel occurs across the length of the combustion chambers. Coolant passageways 250 can extend near cutouts 71 and 72 to cool rotor parts 46.

Rotor assembly 40 is also provided with first and second rotor ports 76 and 77 (FIG. 1). Rotor ports 76 and 77 represent a passage between the interior surfaces and exterior surfaces of rotor 40. Rotor ports 76 and 77 allow working fluid to flow into and from the interior of rotor assembly 40. Both ports preferably carry flows of fresh air and of exhaust.

Cam structures 80 are mounted to rotor 40. Cam structures 80 include first and second cam elements 83 and 84 which are nonrotatably mounted upon first and second cam shafts 81 and 82, such as by interference fit. First and second cam elements 83 and 84 are advantageously of the same cross-sectional size and shape throughout their entire length. The exterior surfaces of the cam elements are preferably symmetric about a bilateral plane (vertical as shown in FIG. 13) extending through the longitudinal rotational axis defined by cam shafts 81 and 82. FIG. 13 further shows the preferred cross-sectional geometric configuration of cam elements 83 and 84. The rotational axis of the cam assembly is indicated as $A_1$. A major curvature surface 87 is defined by a major radius R centered upon axis $A_1$. An opposing or minor curvature surface 88 is defined by a relatively smaller or minor radius $R_s$ also centered upon axis $A_1$.

Lateral cam surfaces 90 are symmetrical about the bilateral plane and defined by radii $R_l$ centered at corner center lines 91 and 92. Corner curvature surfaces 95 having radii $R_o$ are also centered at corner center lines 91 and 92 and are approximately tangent to lateral cam surfaces 90 and major curvature surface 87. Minor curvature surface 88 is also approximately tangent to or blends into lateral cam surfaces 90 where the respective arcs swung by radii $R_s$ and $R_l$ intersect.

The actual size and shape of the cam elements is dependent upon the above radii R, $R_o$, $R_s$, and $R_l$. The shape and size of the cam elements are also dependent upon the following parameters:

(1) S, which is the distance of separation between the axes of rotation of the cam structures;
(2) P which is equal to one-quarter of the nominal rotor angle for which one of the combustion chambers is closed; and
(3) c, the desired clearance between rotors.

The following mathematical equations define the shape and size of cam elements such as cam elements 83 and 84 given the separation distance S, the parameter P, and a defined or assumed value of radius R. The clearance c has not been included in order to simplify the equations. It will be readily apparent that the clearance c must be properly accounted for in final specifications.

$$R/S = \frac{1 - 2R_o}{2 \sin P} + R_o \quad (1)$$

$$R_l/S = 1 - R_o \quad (2)$$

$$R_s/S = 1 - R_o - \frac{1 - 2R_o}{2 \sin P} \quad (3)$$

Housing 22 is advantageously provided with a cutout or recess 270 (FIG. 2), which allows cams 83 and 84 to extend thereinto during portions of the rotational cycle. A projection 280 (FIG. 2) is also preferably provided to close the clearance between the interior of housing 22 and rotor 40 near exhaust passageway 154.

Cam engine 20 is further provided with a suitable synchronization means such as 100 (FIG. 5) for maintaining cam elements 83 and 84 in desired angular orientations. Synchronization means 100 is used to maintain cams 83 and 84 in a fixed angular orientation with respect to the housing 22 despite continuous rotation of rotor 40. Cams 83 and 84 rotate relative to rotor 40, but maintain a constant angular orientation with respect to the housing, the orientation being with the bilateral plane vertical as shown in FIGS. 1-4 and 9-11.

Synchronization means 100 advantageously includes first and second cam shaft cranks 101 and 102, which are nonrotatably connected to cam shafts 81 and 82, respectively. Cam shaft cranks 101 and 102 include first and second offset shafts 103 and 104, respectively. Offset shafts 103 and 104 define rotational axes which are approximately parallel and offset from the rotational axes of cam shafts 81 and 82 by an equal amount. First and second offset shafts 103 and 104 are rotatably received within a connecting or synchronization piece or plate 106, preferably using close tolerance bearings such as first and second ball bearings 107 and 108.

Connecting piece 106 is also rotatably connected to housing 22. Rotatable mounting of piece 106 to housing 22 is advantageously accomplished using a support pin 109 (FIG. 7) which extends from crank case cover 34 and is received within support pin aperture 110 formed in piece 106. Support pin 109 and aperture 110 are preferably constructed so as to form a journal and bearing, respectively. The center line of cylindrical support pin 109 defines a rotational axis of piece 106 which is fixed relative to the housing. Connecting piece 106 rotates about support pin 109 in response to rotation of rotor 40. FIGS. 9-11 show that cam structures 80 revolve about one another as rotor 40 rotates about axis 240. This motion causes a similar but offset rotation of piece 106 about the rotational axis 109a defined by pin 109. The crank arms 101 and 102 assure proper angular orientation of the connected cam shafts 81 and 82.

Figure 5:
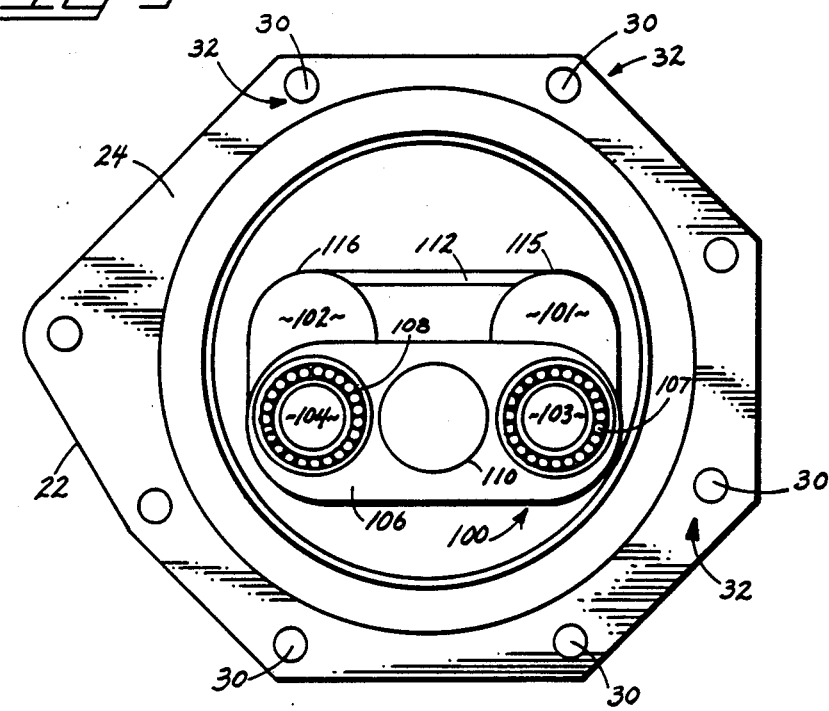
FIG. 5 is a rear end view of the engine of FIG. 1, with the crankcase cover removed.

The synchronization means 100 used for the two-cam embodiment shown in FIGS. 1-12 is also preferably provided with a means for assuring consistent directional rotation of the cam structures throughout the full range of rotational positions. Reference to FIGS. 3 and 11 will indicate that at the vertical position of connecting plate 106, the first and second cam elements 83 and 84 can rotate in either direction. Rotation of one cam element in one direction and the other cam element in the other direction is possible because piece 106 is freely rotatable and the cam geometries do nothing to prevent such from happening. Such cam rotation would render the engine inoperable. Accordingly, a means is preferably provided for assuring proper rotation of both cam elements at these two vertically oriented positions. FIG. 5 shows one means for assuring such consistent directional rotation.

The means for assuring consistent directional rotation of cam structures 80 can be incorporated with synchronization means 100. FIG. 5 shows synchronization means 100 adapted to include a quadrature belt 112. Quadrature belt 112 is any suitable flexible belt such as reinforced rubber belt, flexible link chain, or the equivalent. Quadrature belt 112 extends about two suitable pulleys 115 and 116 mounted coaxially to first and second cam shafts 81 and 82, respectively (see also FIG. 7). Quadrature belt 112 assures that cam shafts 81 and 82 always rotate in the same direction, even when in the vertical position of FIGS. 3 and 11.

FIG. 19 shows an alternative synchronization means 200 which can be used in cam engine 20. Synchronizer 200 includes a pivot gear 201 which is rigidly fixed to crank case cover 34 at the rotor axis 240 in lieu of the offset support pin 109. Idler gears 202 and 203 are rotatably mounted upon rotor assembly 40 at positions which allow them to intermesh with pivot gear 201. This is advantageously accomplished using stub shafts 210 and 211. Cam shaft gears 205 and 206 are nonrotatably connected to cam shafts 81 and 82. Cam gears 205 and 206 are the same size as pivot gear 201. Rotor 40 rotates about a longitudinal axis coaxial with pivot gear 201. Rotation of rotor 40 causes idler gears 202 and 203 to rotate about stub shafts 210 and 211, respectively. Rotation of idlers 202 and 203 causes cam gears 205 and 206 to rotate relative to rotor assembly 40, but remain in an essentially fixed angular orientation with respect to the housing 22 because of the equal rotational speed in the opposite direction. Other means for assuring consistent directional rotation may also be apparent to those of skill in the art.

Cam engine 20 is further advantageously provided with a fuel or other fluid transfer system 120 (FIG. 12). Fluid transfer system 120 is preferably a fuel injection system in engine 20, but can conversely be a means for removing a compressed working fluid from the apparatus when adapted as a compressor or pump. Transfer system 120 can also be used to inject an expansible pressured fluid such as steam into the engine, thus allowing external combustion to be used. Fluid injection system 120 includes an injection distributor 121 which does not rotate and seals against output shaft 28 to provide a ready supply of pressurized fluid thereto (see FIGS. 8 and 12). Output shaft 28 is provided with a plurality of fluid passages 122 and 123 formed therethrough for the associated number of injectors, such as fuel injectors 73 and 74. The fluid injection distributor 121 is constructed so as to provide pressurized fluid to the first fluid passageway 122 during an appropriate portion of the rotational cycle. Fluid passageways 122 and 123 communicate with first injector 73 and second injector 74, respectively (FIG. 8). Timing of the fluid injection is advantageously accomplished by providing a recessed groove 125 of appropriate angular duration so that fluid will be injected during the desired portion of angular rotation. Fluid may be supplied to distributor 121 via a fluid supply line 126. A fluid return line 127 is further provided and communicates with fluid groove 125 so that excess fluid returns to the fuel supply (not shown).

FIGS. 14 and 15 illustrate preferred surface textures for the cam elements. FIG. 14 shows that the end surfaces of cam element 83 can advantageously be provided with a plurality of dimples 130 which help to minimize leakage between the end surfaces of the cam element and planar interior end surfaces 44a and 45a of rotor 40. Other structures and techniques can alternatively be used.

FIGS. 14 and 15 further show preferred surface finish for the major curvature surface 87 of cam elements 83 and 84. Major curvature surface 87 is provided with a plurality of longitudinal grooves 220 formed in the surface in order to impede fluid leakage in between the rotor interior surfaces 67 and 68 and the major curvature surfaces 87. Alternative surface structures and finishes to minimize leakage between the cams and the cams and rotor may also be apparent to those of ordinary skill in the sealing art.

FIG. 16 shows an alternative cam structure 132 which is advantageously used for cam structures 80. Cam structure 132 includes a high-density counterweight 133 adjacent the minor curvature surface 88 for balancing the relatively larger mass associated with the opposite side of the cam element. Rotation of cam 132 is only relative to the rotor 40 and not with respect to housing 22, thus indicating that such counterweight is not necessary, but may be useful in dynamic balancing of engine 20.

Shaft 134 is advantageously provided with longitudinal oil passageways 135 and radial oil passageways 136. Radial oil passageway 136 feeds to a circuitous cam face oil passageway 137 which allows oil to act as a coolant circulated therethrough in order to remove heat which is transferred from the combustion gases or other working fluid to the cam element. The specific configuration for the longitudinal oil passageways 135, radial oil passageways 136, and cam face oil passageways 137 can be varied as will be obvious to one of ordinary skill in the art. Oil passageways such as coolant passageways 250 (FIGS. 2 and 6) can also be used to supply oil to passageway 135 through rotor 40.

Operation of the two-cam engine 20 will now be explained. Engine 20 is specifically adapted for use as an engine operating under a compression-ignition cycle, such as the diesel cycle. It will be readily apparent to those skilled in the art that engine 20 can be adapted to operate as an external combustion engine with a high-pressure working fluid injected thereinto equivalently to injection the fuel herein described or, alternatively, can be additionally adapted to provide spark plugs or other alternative means for automatically or controllably stimulating ignition or expansion of a fuel-air mixture or other working fluid(s). Engine 20 can alternatively be adapted for detonation-ignition by elimination of the described injection means and addition of carburetion means at intake passageway 153 of FIG. 1.

FIG. 1 shows a cross-sectional view of engine 20. First and second cam elements 81 and 82 are positioned relative to rotor 40 so that a combustion chamber 150 is defined therebetween aligned with first injector 73 (FIG. 8). A working fluid such as air has previously been drawn into the engine and confined between first and second cams 83 and 84 and the rotor interior surfaces. The air has been compressed into the minimum volume of combustion chamber 150 shown in FIG. 1. Fuel is injected through first injector 73 and is ignited as a result of the heat of compression or otherwise, as is well known in the art of engines.

Ignition of the compressed fuel-air mixture within combustion chamber 150 causes the rotor to rotate such as clockwise as shown in FIG. 1. Rotation occurs because the volume of the defined working volume or combustion chamber 150 can be increased by merely overcoming the resistance of the rotor assembly to rotaion. FIG. 2 shows rotor assembly 40 rotated approximately 60° from the position shown in FIG. 1. Combustion chamber 150 has now expanded as a result of the rotated position of rotor 40 and the altered relationship between rotor lateral interior surface 68 and first and second cam elements 83 and 84.

It should be further noticed from FIG. 1 that during the minimum volume position of combustion chamber 150 shown therein, the upper sides of cam structures 83 and 84 are adjacent to a cross flow of incoming air or other working fluid. The working fluid flows from the inlet passageway 153 toward the exit or exhaust passageway 154. Air forced in through inlet passageway 153 is used to force residual exhaust gases out through exhaust passageway 154. A suitable fan, turbocharger, supercharger or other suitable driver of the working fluid (not shown) is used in order to assure adequate cross flow. This cross flow or scavenging operation continues until the flow is restricted by angular displacement of the rotor ports 76 and 77 from the inlet and exhaust passageways 153, 154. Positions of rotor 40 during which scavenging does not occur are shown in FIGS. 2–4.

FIG. 3 shows the rotor assembly rotated an additional 30° from the position shown in FIG. 2. The left hand corner curvature of first cam 83 has separated from interior surface 67a, thus allowing the combustion gases to flow into the volume above first cam 83. The scavenging process has previously charged this volume and the volumes at the right side of cams 83 and 84 with fresh, slightly compressed air. The expansion of the combustion gases further pressurizes the fresh charge of air in volume 201 in a process often referred to as ram charging. Additional rotation of the rotor causes the right hand corner curvature of cam 83 to become very close to interior surface 67b, thus effectively sealing against significant flow of fluid and defining a second combustion chamber 151 shown in FIG. 4.

FIGS. 3 and 4 also show that rotation of rotor 40 causes the leading edge 77a of rotor port 77 to pass the leading face 154a of exhaust passageway 154. This allows the pressurized exhaust gases originating from first combustion chamber 150 to flow outwardly through exhaust passageway 154 prior to the cross flow described above.

FIG. 4 indicates that clockwise rotation of rotor 40 causes the working fluid in combustion chamber 151 to become compressed due to the changing geometrical configuration between rotor interior surface 68 and cams 83 and 84. FIG. 4 shows the rotor and cams in a partial compression position approximately 150° of rotation from the position of FIG. 1.

Further rotation of rotor 40 returns the first and second cams 83 and 84 into a horizontally aligned position, similar to FIG. 1 with the first and second cams reversed in position. This is a minimum working volume condition for combustion chamber 151, similar to that shown for the minimum working volume condition for combustion chamber 150 shown in FIG. 1. Fuel or other working fluid is injected through second injector 74 into the compressed working volume 151 in appropriate timed relation to the angular position of rotor 40. Ignition of the working fluid causes high pressure to develop and rotate the rotor. The process described is repeated every one-half rotation of rotor assembly 40.

FIGS. 5, 9, 10 and 11 illustrate the operation of the synchronizing means during engine operation. FIG. 9 shows that first and second cam shaft cranks 101 and 102 have offset shafts 103 and 104 which are offset from the rotational axis of the cam shafts along the same direction as the bilateral plane of cam elements 83 and 84. The exact amount of offset is not crucial, but determined by the desired lever arm needed for smooth operation and the position of other engine components. The offset is equal to the distance between the rotational axis of connecting plate 106 about support pin 110 as compared to the axis 240 of rotor 40. Thus as rotor 40 rotates, the cam structures go through a leap-frogging type rotation with respect to the rotor, but maintain constant orientation relative to the housing.

FIG. 17 shows an alternative three-cam apparatus according to this invention. Three-cam engine 170 includes a housing 171 which rotatably mounts a rotor 172. Rotor 172 is provided with a generally cylindrical construction similar to that described above with respect to rotor 40. Interior surfaces of rotor 172 are approximately defined by three cylinders extending longitudinal and parallel with the rotational axis of the rotor. Interior surfaces of the rotor include first, second and third cylindrical lateral interior surfaces 173–175. The radii of interior cylindrical rotor surfaces 173–175 are defined by the major radii of first, second and third cam structures 177–179, plus an additional clearance. Interior surfaces of rotor 172 also include cutouts 181–183 which have corresponding first, second and third injectors 185–187.

In operation, three-cam engine 170 performs similar to the two-cam engine 20 described above. The three-cam engine does, however, provide three separate compression, ignition and expansion cycles per single rotation of rotor 172. Positioning of intake passageway 189 and exhaust passageway 190 are used to provide proper timing. The angular size and position of rotor ports 191, 192, and 193 are selected to determine scavenging timing for a particular design.

A synchronization means (not shown) having three shafts instead of two is used with engine 170. Such a three shaft synchronization means can be constructed similarly to synchronizers 100 and 200. The means for assuring consistent directional rotation described above is not needed as a distinct apparatus since the three shaft synchronizing means assures proper directional rotation of the cam elements. It is further possible to attach an output shaft (not shown) to such a three shaft synchronizing means to have a second output from engine 170.

FIG. 18 shows a further alternative cam engine 400 according to this invention. Cam engine 400 includes a housing 410 having intake and exhaust passageways 411 and 412. A rotor 420 is rotatably mounted within housing 410 in a manner similar to that described above with regard to the two-cam and three-cam versions. Interior surfaces of rotor 420 have cylindrical surfaces defined by the major radii of the cam structures 431–434, plus an additional clearance. There are also four injector cutouts 441–444 having associated injectors 446–449. Rotor 420 further has rotor ports 451–454 which allow inflow and outflow of the working fluid through inlet and exhaust passageways of the housing. Other features of cam engine 400 will be apparent from the descriptions given hereinabove for the two and three cam engines.

The multiple cam apparatus according to this invention preferably have between two and six cams per rotor.

It will be readily apparent to those skilled in the art that the internal combustion engine 20 can be adapted for use as a compressor. In such application the working fluid such as air can be drawn in through intake passageway 153 and rotor port 77. Thereafter, the air is compressed in chambers 150 and 151 as described above. The minimum working volume positions shown in FIG. 1 and the equivalent 180° position therefrom, create a highly compressed state in chambers 150 and 151. The compressed fluid is withdrawn through an outflow system (not shown) which is similar to the fuel injectors 73 and 74 and the distribution system 120 used to appropriately supply fuel to engine 20. It will further be apparent that other apparatus may advantageously employ the novel mechanism of this invention for expanding, compressing or otherwise forcing a working fluid.

Apparatus according to this invention can be constructed using a variety of metallic and non-metallic materials appropriately formed into components and sub-components which exhibit the structural and functional interrelationships described herein. Such components can be assembled using a variety of techniques which will be apparent to those of skill in the art.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

What is claimed is:

1. An apparatus for mechanically defining a variable displacement working volume, comprising:
   a housing having a least one passageway through which a working fluid can enter or leave an interior of said housing;
   a rotor mounted for rotation at least partially enclosed within said housing; said rotor having an interior with interior surfaces, and at least one port through which a working fluid can enter and leave the interior of said rotor;
   at least two cam structures mounted at least partially within the interior of the rotor and adapted for rotational motion relative to said rotor about axes of rotation of said cam structures; exterior surfaces of at least two of said cam structures serving with said interior surfaces of the rotor to variably define said working volume during at least portions of relative rotational motion of the cam structures with respect to the rotor; said exterior surfaces of the cam structures including major curvature surfaces; the major curvature surface of each cam structure being at least partially defined by an associated major radius which defines a circular arc when swung about the associated axis of rotation of the cam structure; the circular arc defined by each cam structure overlapping at least one circular arc defined by at least one adjacent cam structure;
   synchronizing means for maintaining said cam structures in approximately constant angular orientations with respect to the housing as the rotor is rotated with respect to said housing.

2. The apparatus of claim 1 wherein the cam synchronizing means maintains all cam structures in approximately constant and parallel angular orientations with respect to said housing as the rotor is rotated.

3. The apparatus of claim 1 wherein there are at least two and no more than six cam structures mounted to said rotor.

4. The apparatus of claim 1 wherein lateral interior surfaces of the rotor are concave and substantially defined by said circular arcs plus clearance.

5. The apparatus of claim 1 wherein the cam structures are mounted for rotation about cam axes of rotation which are parallel to one another and further parallel to a rotor axis of rotation defining rotation of said rotor with respect to the housing.

6. The apparatus of claim 1 wherein the housing is provided with at least two passageways for allowing a working fluid to pass into and from the interior of said housing.

7. The apparatus of claim 1 wherein:
   the housing includes a plurality of passageways allowing a working fluid to pass into and from the interior of the housing;
   the rotor is mounted within the housing and is at least partially enclosed thereby; and
   the rotor interior includes circularly concave interior surfaces having radii which correspond to the major radii of associated cam structures plus clearance.

8. The apparatus of claim 7 wherein there are two cam structures.

9. The apparatus of claim 7 wherein the synchronizing means includes a synchronizing piece mounted for rotation upon the housing and crank members non-rotatably connected to the cam structures and rotatably connected to the synchronizing piece.

10. The apparatus of claim 7 wherein the cam structures have cross-sectional cam profiles which are substantially uniform along longitudinal rotational cam axes thereof; said cross-sectional cam profiles being defined by:
   major radii centered upon said rotational cam axes and defining a major peripheral surface;
   minor radii centered upon said rotational cam axes and defining a minor peripheral surface radially opposed from said major peripheral surface;
   two lateral radii symmetrical about a bilateral plane defining two lateral peripheral surfaces; and
   two corner radii defining corner peripheral surfaces located at intersecting segments between said lateral peripheral surfaces and said major peripheral surface.

11. The apparatus of claim 7 wherein the rotational axes of the rotor and cam structures are parallel.

12. The apparatus of claim 11 wherein the rotor is substantially cylindrical.

13. An apparatus for mechanically defining a variable displacement working volume, comprising:
   a housing having at least one intake passageway and at least one exhaust passageway extending between a housing interior and a housing exterior;
   a rotor mounted for rotation with respect to the housing about a rotor axis of rotation; said rotor having exterior surfaces and interior surfaces; said exterior and interior surfaces adjoining at at least one rotor port which allow a working fluid to pass from outside the rotor to a rotor interior substantially defined by said interior surfaces of the rotor;

a plurality of cam structures mounted for rotation relative to said rotor about cam structure rotational axis; said cam structures being mounted at least partially within said rotor interior and being shaped to define a working volume between two adjacent cam structures and interior surfaces of said rotor during at least portions of rotational motion of the cam structures and rotor, to allow compression and expansion of the working volume as a result of rotation of the rotor; exterior surfaces of said cam structures each including a major curvature surface which is at least partially defined by an associated major radius of curvature centered upon the associated axis of rotation of the cam structure; each major radius of curvature being greater than one-half of a separation distance existing between the associated axis of rotation of the cam structure and adjacent axes of rotation of adjacent cam structures; and cam synchronizing means for maintaining said cam structures in approximately constant angular orientations with respect to the housing as the rotor is rotated relative to the housing.

14. The apparatus for mechanically defining a variable displacement working volume of claim 13 further comprising fluid injection means for injecting a suitable fluid into the working volume.

15. The apparatus for mechanically defining a variable displacement working volume of claim 14 wherein the fluid injection means is a fuel injection system.

16. The apparatus for mechanically defining a variable displacement working volume of claim 13 wherein the cam structures have cross-sectional profiles symmetric about a bilateral plane and having convex outer surfaces.

17. The apparatus for mechanically defining a variable displacement working volume of claim 13 wherein the rotor has substantially cylindrical exterior surfaces, and has lateral interior surfaces which are cylindrically concave about the axis of rotation of said cam structures with radii approximately equal to the associated major radius of curvature of the associated cam structure plus clearance.

18. An internal combustion engine comprising:
a housing having housing walls which substantially enclose a housing interior; said housing further including at least one intake passageway and at least one exhaust passageway through which at least one working fluid passes to and from said housing interior;

a rotor mounted within the housing interior for rotation about a rotor axis of rotation which extends longitudinally within said housing; said rotor having exterior surfaces which are substantially cylindrical about said rotor axis of rotation; said rotor further including interior surfaces having cylindrically concave interior surface portions extending longitudinally within said rotor to define a rotor interior; said rotor further having at least one rotor port communicating the rotor interior with the housing passageways to allow passage of a working fluid into and from said rotor interior;

a plurality of cam structures mounted substantially within the rotor for rotation with respect thereto; said cam structures including cam surfaces which are convex; exterior surfaces of said cam structures each including a major curvature surface which is at least partially defined by an associated major radius of curvature centered upon the associated axis of rotation of the cam structure; each major radius of curvature being greater than one-half of a separation distance existing between the associated axis of rotation of the cam structure and adjacent axes of rotation of adjacent cam structures; and cam synchronizing means for maintaining said cam structures in approximately parallel relative angular orientations with respect to said housing as the rotor rotates and the cam structures revolve about each other.

19. The internal combustion engine of claim 18 wherein the cam synchronizing means comprises a synchronization piece rotatably mounted to said housing in an offset position from said rotor axis of rotation; said synchronization piece being rotatably connected to crank arms connected to said cam structures; said synchronizing piece maintaining approximately constant relative angular orientations of the cam structures relative to said housing.

20. The internal combustion engine of claim 18 wherein there are two cam structures, and further comprising means for assuring consistent directional rotation of the cam structures.

21. The internal combustion engine of claim 18 further comprising fuel injection means connected to said rotor for injecting fuel between cam structures and said rotor interior surfaces during appropriate portions of a rotational cycle.

22. The internal combustion engine of claim 21 wherein said interior surfaces of said rotor further comprise at least one combustion chamber recess formed between adjacent cylindrically concave interior surface portions; said fuel injection means being adapted to direct fuel longitudinally along said combustion chamber recess.

23. The internal combustion engine of claim 18 wherein the cam structures have cross-sectional cam profiles which are substantially uniform along longitudinal rotational cam axes thereof; said cross-sectional cam profiles being defined by:
major radii centered upon said rotational cam axes and defining a major peripheral surface;
minor radii centered upon said rotational cam axes and defining a minor peripheral surface radially opposed from said major peripheral surface;
two lateral radii symmetrical about a bilateral plane defining two lateral peripheral surfaces; and
two corner radii defining corner peripheral surfaces existing at intersecting segments between said lateral peripheral surfaces and said major peripheral surface.

24. The internal combustion engine of claim 23 wherein there are at least two and no more than six cam structures rotatably mounted to said rotor.

25. The internal combustion engine of claim 24 wherein the cam structures have peripheral surfaces which extend beyond the exterior surfaces of said rotor during portions of rotor rotation.

* * * * *